(No Model.)
A. B. DISS.
FURNITURE CASTER.
No. 506,813. Patented Oct. 17, 1893.
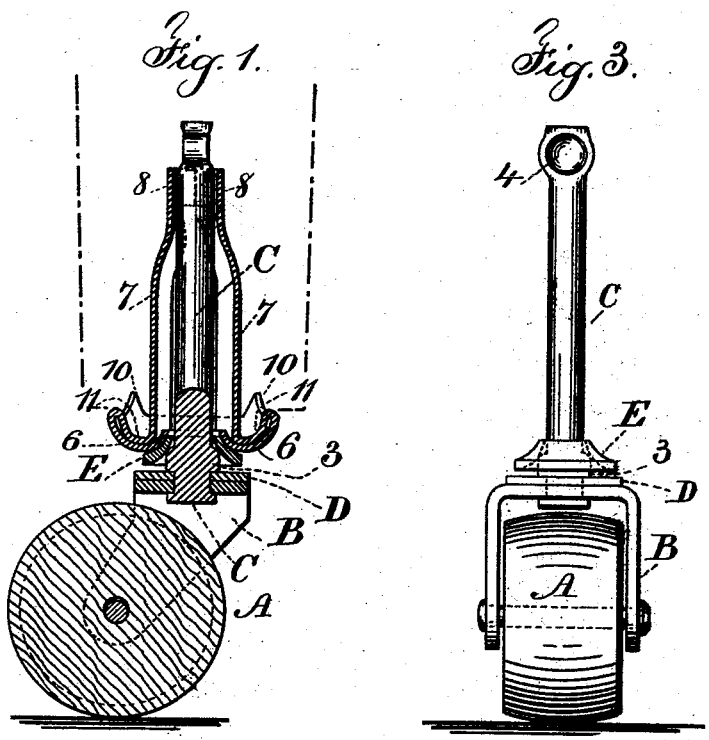
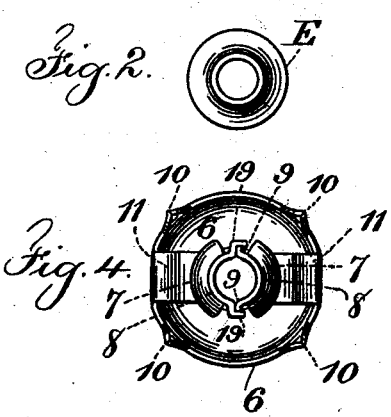
Witnesses
Chas. N. Smith
J. Staib
Inventor
Albert B. Diss
per Lemuel W. Serrell
Atty.

UNITED STATES PATENT OFFICE.

ALBERT B. DISS, OF BROOKLYN, NEW YORK.

FURNITURE-CASTER.

SPECIFICATION forming part of Letters Patent No. 506,813, dated October 17, 1893.

Application filed March 2, 1893. Serial No. 464,335. (No model.)

*To all whom it may concern:*

Be it known that I, ALBERT B. DISS, a citizen of the United States, residing at Brooklyn, in the county of Kings and State of New York, have invented an Improvement in Furniture-Casters, of which the following is a specification.

In Letters Patent No. 436,307, granted to me September 9, 1890, the caster wheel is represented as provided with a pintle or pivot pin passing into a socket made of sheet metal bent up into shape and having a center plate perforated and stamped up with an inward flange around the central opening, the center plate bearing upon the top surface of the horn frame carrying the caster wheel, the pintle having a collar or flange within the opening of the center plate, but the center plate being made of sheet metal does not present the necessary wearing surface for the pintle and under the heavy pressure often coming upon the pintle hole in the center plate it is frequently enlarged and unduly worn; beside this the friction of the center plate upon the top of the horn frame sometimes interferes with the free movement of the caster wheel and horn frame upon the pintle. The present improvement is made with reference to removing these difficulties and lessening the friction of the parts and increasing the durability of the caster.

In the drawings, Figure 1 is a vertical section of the improved caster. Fig. 2 is a detached view of the conical washer. Fig. 3 is an elevation of the pintle, horn frame and caster wheel detached, and Fig. 4 is a plan view of the sheet metal socket.

The sheet metal socket is constructed in a manner similar to that represented in my aforesaid patent, that is to say, the center plate 6 is cup-shaped with spurs or projections 10 to penetrate the wood of the leg. The connections 11 are folded back upon the interior of the concave center plate, and the portions 7 are cylindrical segments tapering at the upper ends to the half circles 8 with the wings 9 and 19 which bear against each other, but I find it advantageous to make the wings 19 wider than the wings 9 in order that the edges of the wings 19 may be turned up to receive between them the ends of the wings 9, so as to prevent any lateral displacement as the socket may be driven into the hole in the furniture leg.

The center portion of the plate 6 around the central opening is preferably made concave, as represented, instead of being turned up with an inward flange or inturned bush, as in the aforesaid patent. This is not only more easily made but the metal is less liable to crack or split when stamped up in the form represented than it is when made as an inturned bush.

The caster wheel A and the horn frame B are of ordinary character, and the pintle C is provided with a collar or flange 3 setting against the washer D, the washer and horn frame being riveted together firmly by upsetting the end of the pintle C.

The conical washer E is made of sufficiently thick metal to obtain the necessary strength and wear and it is concaved or made conoidal to correspond to the shape of the metal around the central opening in the center plate 6, so that when the parts of the caster are set together this conoidal washer E is received into the central recess of the center plate 6 and such washer rests upon the collar 3 of the pintle, and the weight, friction and wear are upon the collar and the conoidal washer, and there is but little risk of the washer being displaced laterally by the weight or lateral strain because of such washer E setting firmly into the conoidal recess in the center plate 6, and the bearing of the washer E upon the collar 3 is much smaller than the bearing that has heretofore existed of the washer D against the surface of the center plate 6, hence the parts will wear much longer and turn more freely than in the casters made under the aforesaid patent.

Instead of upsetting the upper end of the pintle C I spread the same by stamping into the metal at opposite sides conoidal recesses 4 which cause the metal to spread laterally and form a head with lateral projections, the extreme upper end of the pintle being tapering, and these conoidal recesses come entirely above the upper end of the sheet metal socket. Hence after the sheet metal socket has been driven into the hole bored for it, the pintle can be easily thrust into place because the conical end will displace and spring back the end portions 8, 8 and 9 and 19, that form clips for the pintle, and by partially rotating the pintle as it is forced into place the projecting edges act as a pry to open the spring clip of the socket to allow these projections to pass through and be above the spring socket to prevent the caster dropping out when the article of furniture is lifted.

I claim as my invention—

1. The combination with the caster wheel, horn frame and pintle having a collar, of a conoidal washer surrounding the pintle and bearing upon the collar, a socket having a central opening for the pintle and recessed at the end for the reception of the conoidal washer, substantially as set forth.

2. The sheet metal socket for a caster, having two segmental spring sides, half circle ends with wings, the wings at one side having edge flanges receiving between them the wings at the other side, substantially as set forth.

3. The combination with the sheet metal socket having half circle spring clips at the end, of a caster wheel, horn frame and pintle, the pintle projecting above the spring clips and having conoidal recesses at opposite sides and spread laterally to sustain the pintle and caster wheel upon the clips of the spring socket when the article of furniture is lifted, substantially as set forth.

Signed by me this 24th day of February, 1893.

ALBERT B. DISS.

Witnesses:
   GEO. T. PINCKNEY,
   WILLIAM G. MOTT.